United States Patent [19]

Uram, Jr.

[11] 4,294,886

[45] Oct. 13, 1981

[54] TRANSPARENCIES PRODUCED FROM EPOXY RESINS CURED WITH ADDUCTS OF TRIMETHOXYBOROXINE AND BENZYL ALCOHOL

[75] Inventor: John R. Uram, Jr., Glendale, Ariz.

[73] Assignee: Goodyear Aerospace Corporation, Akron, Ohio

[21] Appl. No.: 70,390

[22] Filed: Aug. 28, 1979

[51] Int. Cl.³ ............................................. C08G 59/40
[52] U.S. Cl. .................................... 428/412; 428/413; 428/414; 528/89; 528/106; 528/108; 528/110; 528/394
[58] Field of Search ................. 528/89, 106, 108, 110, 528/394; 428/412, 413, 414

[56] References Cited

U.S. PATENT DOCUMENTS

| 3,134,754 | 5/1964 | Brunner et al. | 260/47 |
| 3,378,504 | 4/1968 | Lee et al. | 260/2 |

*Primary Examiner*—Earl A. Nielsen
*Attorney, Agent, or Firm*—P. E. Milliken; E. W. Oldham; J. H. Hornickle

[57] ABSTRACT

A highly heat resistant transparency of epoxy resins cured with adducts of trimethoxyboroxine and benzyl alcohol is disclosed. This transparency may exist in a composite with other layers of transparent material known to those skilled in the art. The epoxy resin having the trimethoxyboroxine and benzyl alcohol may also have triphenyl phosphite which further increases the resistance to intense heat for these transparencies in their use on military and industrial hardware.

11 Claims, 5 Drawing Figures

TRANSPARENCIES PRODUCED FROM EPOXY RESINS CURED WITH ADDUCTS OF TRIMETHOXYBOROXINE AND BENZYL ALCOHOL

BACKGROUND OF THE INVENTION

Heretofore, the use of transparencies in military and industrial hardware has required exacting properties for their certified use. For example, a military helicopter having vast areas of transparent material will require special transparent material having identifiable indices of refraction to prevent internal reflection of sunlight. Other transparencies require resistance to penetration by projectiles. Still other transparencies are designed for resistance to abrasion.

The use of these transparencies in military and industrial applications has been severely limited by the temperatures these composite materials could withstand. Direct application of a heat source or a high energy point of origin could quickly alter the physical properties of the composite materials. Whether the thermal effects be generated by fossil fuel fires or laser application, the conventional transparencies lacked sufficient resistance to the intense heat generated. Therefore, the need exists for a material which is heat resistant, in order to complement the impact, ballistic, abrasion, or light resistant materials presently existing in composite transparencies.

SUMMARY OF THE INVENTION

Therefore, it is an object of the invention to provide a transparency produced from epoxy resins cured with adducts of trimethoxyboroxine and benzyl alcohol to provide an intense heat resistant material to be incorporated with composite transparencies for use in military and industrial applications.

It is another object of the invention to provide a transparency produced from epoxy resins, as above, wherein the intense heat resistant material has the same or similar index of refraction in order that it be used with other composite materials to complement their properties.

Moreover, it is an object of the invention to provide transparencies produced from epoxy resins, as above, wherein the intense heat resistant material may control the reactivity of the entire transparency against degradation of properties caused by intense general heat or a high energized point source.

It is yet anothr object of the present invention to provide a process for the production of transparencies having epoxy resins cured with adducts of trimethoxyboroxine and benzyl alcohol to insure intense heat resistant properties in the entire transparency.

Still another object of the invention is to provide a transparency produced from epoxy resins cured with adducts of trimethoxyboroxine and benzyl alcohol and triphenyl phosphite to improve the intense heat resistant characteristics of the transparent composite.

Yet another object of the invention is to provide a transparency produced from epoxy resins cured with adducts of trimethoxyboroxine and benzyl alcohol and triphenyl phosphite which can be formed into curved articles.

These, and other objects which will become more apparent as the detailed description of the preferred embodiment proceeds, are achieved by: a transparent composition having resistance to intense heat, comprising: a transparent blend having from 80 parts to about 100 parts of an epoxy resin; from 7.5 parts to about 30 parts of trimthoxyboroxine; and from 1 part to about 10 parts of a phenyl substituted alkyl alcohol. The objects also are achieved by: a transparency composition having resistance to intense heat, comprising: a transparent blend having from 80 parts to about 100 parts of an epoxy resin; from 7.5 parts to about 30 parts of trimethoxyboroxine; from 1 part to about 10 parts of a phenyl substituted alkyl alcohol; and from 5 parts to about 25 parts of a phosphite selected from the group consisting of diphenyl phosphite, trisnonylphenyl phosphite, triphenyl phosphite, diphenylisodecyl phosphite, diphenylisooctyl phosphite and phenyldiisodecyl phosphite.

DESCRIPTION OF THE DRAWINGS

For an understanding of the invention, reference is had to the following drawings, wherein.

DETAILED DESCRIPTION OF THE PREFERRED EMBODIMENTS

Transparencies that have been produced with epoxy resins desiring to achieve heat resistant properties have typically included trimethoxyboroxine. Typical epoxy resins include, but are not limited to, bisphenol-A type, bisphenol-F type, and novolac type epoxy resins. Trimethoxyboroxine has exhibited, in combination with epoxy resin, a resistance to heat from a general or point source up to temperatures of 2000° F. However, a major complication is the low concentration of trimethoxyboroxine in the epoxy resin system. Previously, for large casting purposes, it was possible to use a concentration of trimethoxyboroxine of 5–7.5 parts per hundred parts of epoxy resin (PHR). Any greater concentration would deleteriously promote the reaction between the trimethoxyboroxine and epoxy resin, resulting in a short gel time making it extremely impractical to cast large panels.

Figure 4:
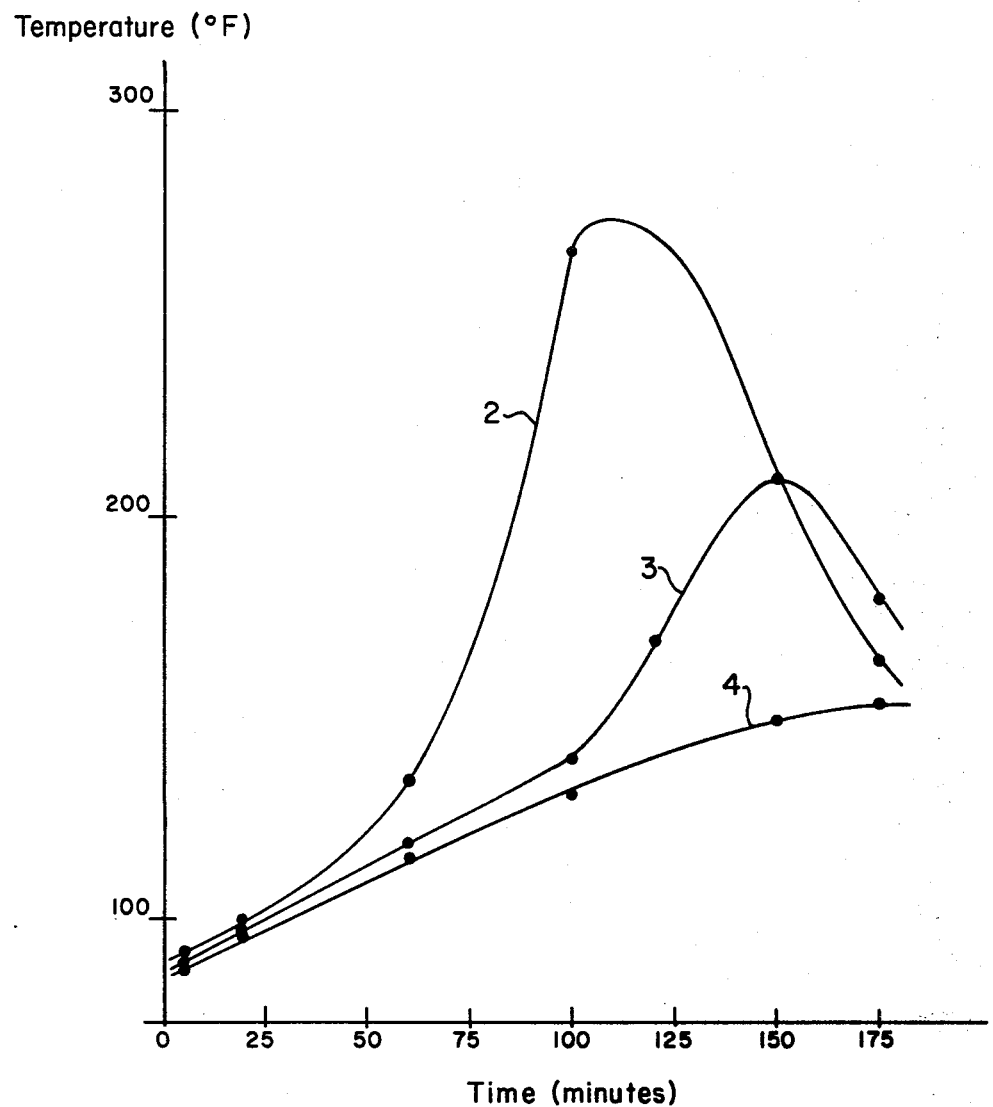
FIG. 4 is a graph showing the effect of alcohol levels on the maximum exotherm in the reaction system.

It has been found that higher concentrations of trimethoxyboroxine can be incorporated into an epoxy resin system and still have sufficient time to cast large sheets if a phenyl substituted alkyl alcohol is added. The alcohol acts as a retarder and inhibitor for the trimethoxyboroxine epoxy reaction, permitting the usage of an increased concentration of the trimethoxyboroxine and a concomitant increase in heat resistant properties. This concentration may be readily increased to 30 parts of trimethoxyboroxine per hundred parts of epoxy resin. Not only is the rate of reaction between the trimethoxyboroxine and epoxy resins inhibited, but the maximum exotherm is significantly reduced with the phenyl substituted alkyl alcohol addition, as shown in FIG. 4.

TABLE 1

THE EFFECT OF BENZYL ALCOHOL ON MAXIMUM EXOTHERM

|  | Curve 2 | Curve 3 | Curve 4 |
|---|---|---|---|
| Trimethoxy Boroxine | 10 | 10 | 10 |
| Benzyl Alcohol | 2 | 2 | 2 |
| Dow DEN-431 | 85 | 85 | 85 |
| Neopentyl Glycol Diglycidyl Ether | 15 | 15 | 15 |
| Gel Time (Minutes) | 65 | 86 | No sharp gel time |
| Maximum Exotherm (°F.) | 270 | 215 | 155 |

While phenyl substituted alkyl alcohols permit increased concentration of the trimethoxyboroxine in the epoxy resin, benzyl alcohol is preferred. Benzyl alcohol is preferred because of its purity, as well as its index of refraction, its clear color, its high flash point, its relatively low solubility in water, its low viscosity, and its high boiling point.

Both the epoxy resins capable of serving as the matrix for the intense heat resistant composite and the trimethoxyboroxine and their heat resistant properties are known to those skilled in the art of composite transparency production. However it is the inclusion of the phenyl substituted alkyl alcohol which enables one to increase the level of trimethoxyboroxine which results in an increase in intense heat resistance for the transparency not otherwise present. The phenyl substituted alkyl alcohol is present in a concentration of from about 20 parts to about 50 parts per one hundred parts of trimethoxyboroxine or from about 1 part to about 10 parts per one 100 parts of epoxy resin. Preferably, the concentration of benzyl alcohol is 33 parts to one hundred parts of trimethoxyboroxine, or 3.3 parts to one hundred parts of epoxy resin.

Figure 1:
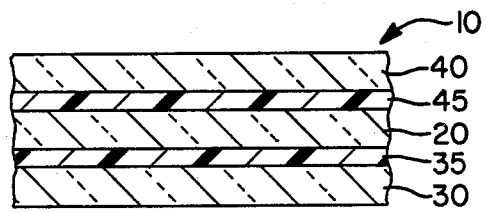
FIG. 1 is a cross sectional view of the transparency composite having the intense heat resistant interlayer.

Referring now to FIG. 1, it may be seen that the transparency composite, generally referred to as 10, is composed of three layers with the epoxy resin interply 20, a reaction product of an adduct of trimethoxyboroxine and benzyl alcohol with an epoxy resin placed between an inside ply 40 and an outside ply 30. The outside ply 30 may be composed of transparent materials well known to those skilled in the art and specifically providing impact, ballistic, abrasion, weather resistant and light reflectant resistant properties which resin interply 20 complements. Typically, this outside ply 30 may be composed of acrylic, polycarbonate, polyurethane and any of the silicates commonly known as glass. Likewise, inside ply 40 may be chosen from those same transparent materials or others well known to those skilled in the art which are not necessary for impact, ballistic, abrasion, weather resistant or light reflection resistance.

Figure 3:
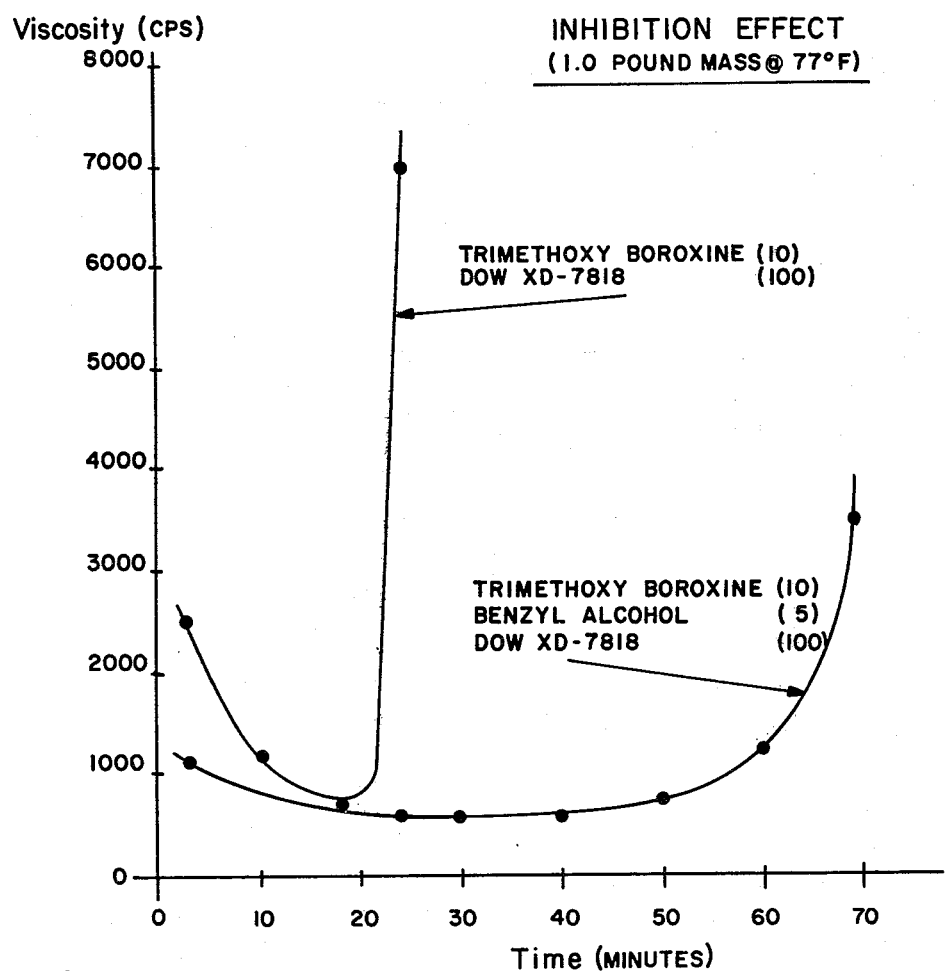
FIG. 3 is a graph of the production of the transparency having benzyl alcohol showing the increase in gel time.

All of the components of interply 20 are mixed and degassed, then cast against an acrylic ply through the use of a casting cell technique well known to individuals in the industry. Should it be necessary to cast interply 20 by itself, the same technique can be used, the only difference being interply 20 would be cast against a chemically treated glass plies, such that after cure the glass plies can be removed, resulting in an optically clear interply 20. This interply casting can then be bonded to other transparent layers with materials as discussed below. However, the use of the alcohol permits larger castings than previously possible. Gel times are increased by the addition of the alcohol to permit larger castings, as may be seen in FIG. 3.

When joining the various plies 20, 30 and 40 of the transparency composite 10, it may be necessary to use binding means to insure adequate contiguity between the various layers. For example, binding means 45 may exist between the intense heat resistant resin interply 20 and inside ply 40, and this binding means 45 may be chosen from adhesives such as silicones, urethanes and epoxies. Also, binding means 35 may be necessary between intense heat resistant resin interply 20 and outside ply 30, the composition of such binding means being typically silicones, urethanes, and epoxies.

The intense heat resistant resin interply 20 may optionally be composed of an epoxy resin cured with adducts of trimethoxyboroxine, phenyl substituted alkyl alcohols, and organic phosphorus compounds selected from the following group: diphenyl phosphite, trisnonylphenyl phosphite, triphenyl phosphite, diphenylisodecyl phosphite, diphenylisooctyl phosphite and phenyldiisodecyl phosphite. Preferably, diphenyl phosphite and triphenyl phosphite may be used. The addition of from 50 parts to 250 parts of triphenyl phosphite per 100 parts of trimethoxyboroxine or from about 5 parts to about 25 parts per 100 parts of the epoxy resin dramatically increases the intense heat resistant properties of the interply 20 at higher temperatures, typically greater than 2000° F. The addition of this amount of triphenyl phosphite provides sufficient phosphorus in the resin to increase the time of burn-through of a ¼" casting of interply 20 almost ten times as long as interply 20 without phosphorus at these high temperatures. The addition of phosphorus is further beneficial by providing a greater than 20% increase in time of burning at the lower temperatures around 2000° F. Therefore, the inclusion of this phosphite significantly increases the intense heat resistant properties already present in the interlayer 20 and complements the other resistant properties in outer layer 30 in the transparency composite 10.

Figure 2:
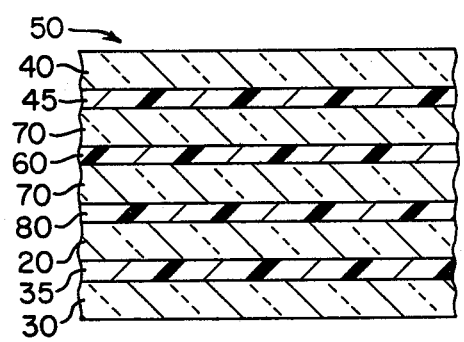
FIG. 2 is a cross sectional view of the clad transparency composite having the intense heat resistant interlayer.

Referring now to FIG. 2, the importance of intense heat resistant epoxy resin interply 20 in a clad composite transparency may be understood. This transparency 50 is shown cross sectionally to demonstrate the effectiveness of a particular clad composite format. Clad outside ply 30 having binding means 35 is secured to intense heat resistant resin interply 20 comprising an epoxy resin cured with adducts of trimethoxyboroxine and benzyl alcohol alone or together with triphenyl phosphite. A silicone interlayer 80 functions as a flexible adhesive to the opposite surface of interply 20 to a silicate layer 70 typically composed of soda lime glass, borosilicate glass, aluminosilicate glass, silica glass or 96% silica glass. On the opposite side of silicate layer 70 is an interlayer 60 which consists of a silicone or polyurethane or polyvinyl butyral interlayer. On the opposite side of interlayer 60 is a second silicate layer 70. On the opposite side of the second silicate is binding means 45 which consists of a silicone or polyurethane interlayer. On the opposite side of the binding means 45 is the inside ply 40 of the composite, composed of the same materials as discussed above, including polycarbonate. It has been found that the combination of these layers 20, 30, 35, 40, 45, 60, 70, and 80, in the order described above provides a synergistic resistance greater than the application of layers 30 and 40 surrounding interlayer 20. Clad outer layer 30 may be selected from those transparent materials commonly known to those skilled in the art, as described above and may typically be acrylic.

Figure 5:
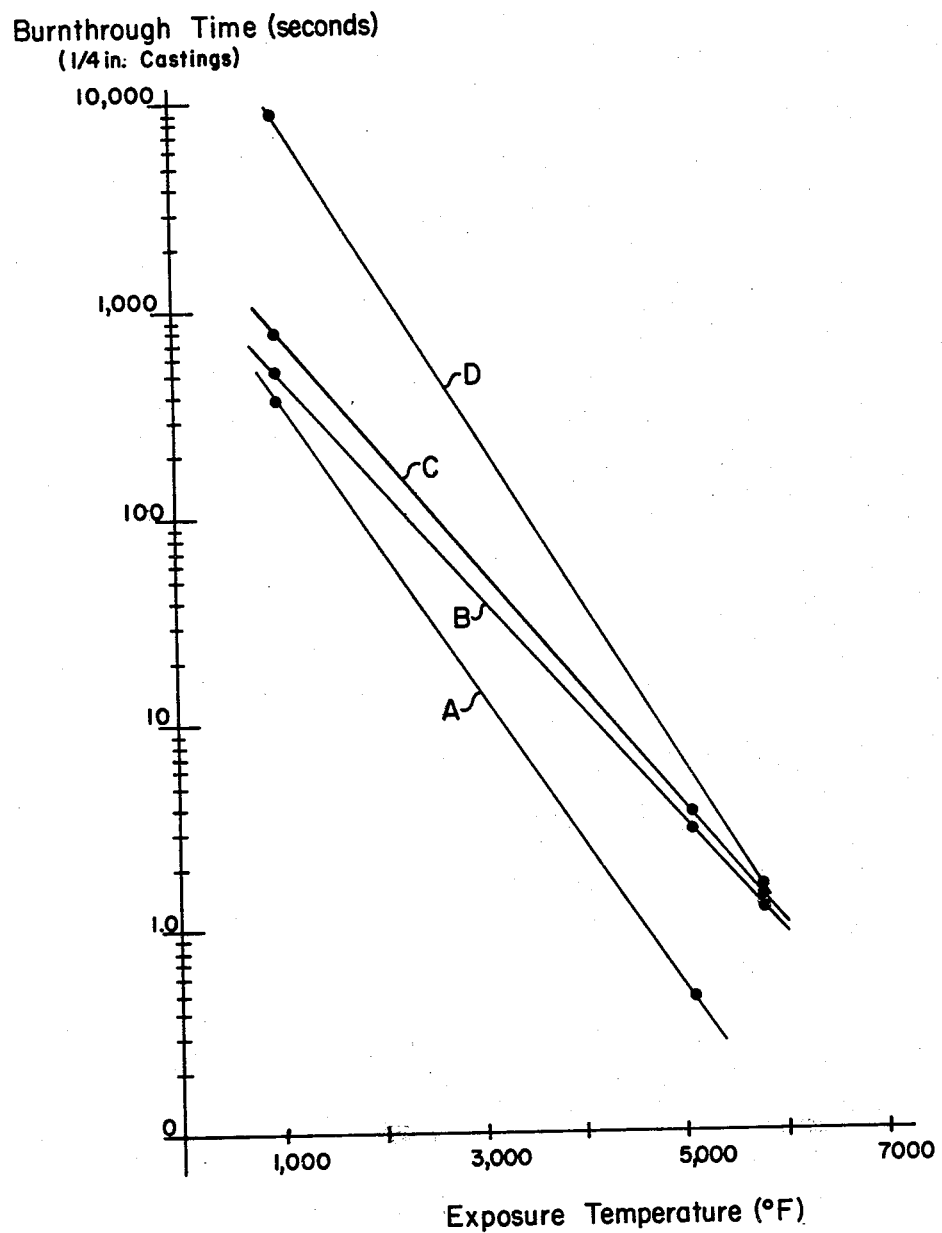
FIG. 5 is a graph showing the increased burnthrough resistance on the transparencies having benzyl alcohol and triphenyl phosphite.

For an understanding of the improved heat resistant properties of interply 20, reference is had to FIG. 5

TABLE 2

HEAT RESISTANT TRANSPARENCIES - RELATIONSHIP BETWEEN BURNTHROUGH TIME AND EXPOSURE TEMPERATURE

| | Line | | | |
|---|---|---|---|---|
| | A | B | C | D |
| Trimethoxy Boroxine | 7.5 | 10 | 10 | 7.5 |
| Benzyl Alcohol | — | 5 | 3 | 2.25 |
| Triphenyl Phosphite | — | 5 | 10 | — |
| DER-332 | 100 | — | — | — |
| DEN-431 | — | 85 | 90 | 90 |
| Heloxy-68 | — | 15 | — | — |
| Silane A-187 | — | 1 | 1 | 1 |
| Diphenyl Phosphite | — | — | — | — |
| Burnthrough at 2000° F. (secs.) | 378 | 522 | 790 | 9000 |
| Burnthrough at 6000° F. (secs.) | 0.4 | 3.0 | 3.7 | 5.8 |

It can be seen from FIG. 5 that by the addition of benzyl alcohol, a higher concentration of trimethoxyboroxine can be incorporated, resulting in improved, burnthrough resistance at 2000° F. and at 6000° F. The addition of triphenyl phosphite also enhances the burnthrough resistance at 2000° F. and at 6000° F.

Transparencies 10 and 50 which contain interply 20 may be utilized in various military and industrial applications. Typically, these applications may include the use of transparencies in military hardware and aircraft, as well as spacecraft. Further, industrial applications include transparencies where protection against the thermal effects of fossil fuel fires, thermal nuclear blasts, and high energy radiation are required.

While in accordance with the Patent Statutes, one best mode and preferred embodiment of the invention has been provided, the invention is not to be limited thereto or thereby. Therefore, for an understanding of the scope of the invention, reference is had to the following claims.

What is claimed is:

1. A transparent composition having resistance to intense heat, comprising:
   a transparent blend having (a) from 80 parts to about 100 parts of an epoxy resin;
   (b) from 7.5 parts to about 30 parts of trimethoxyboroxine; and
   (c) from 1 part to about 10 parts of a phenyl substituted alkyl alcohol.

2. A transparent composite, wherein said transparent blend according to claim 1 is contiguously sandwiched between transparent materials selected from the group consisting of acrylic, polycarbonate, polyurethane and silicate glass and combinations thereof, to produce a composite transparency having an inside ply and an outside ply.

3. A transparent composite according to claim 2, wherein said alcohol is benzyl alcohol.

4. A transparent composite according to claim 3, wherein said trimethoxyboroxine conprises about 10 parts and said benzyl alcohol comprises about 3 parts.

5. A transparent composition having resistance to intense heat, comprising a transparent blend having
   (a) from 80 parts to about 100 parts of an epoxy resin;
   (b) from 7.5 parts to about 30 parts of trimethoxyboroxine;
   (c) from 1 part to about 10 parts of a phenyl substituted alkyl alcohol; and
   (d) from 5 parts to about 25 parts of a phosphite selected from the group consisting of diphenyl phosphite, trisnonylphenyl phosphite, triphenyl phosphite, diphenylisodecyl phosphite, diphenylisooctyl phosphite and phenyldiisodecyl phosphite.

6. A transparent composite, wherein said transparent blend according to claim 5 is contiguously sandwiched between transparent materials selected from the group consisting of acrylic, polycarbonate, polyurethane, silicate glass, and combinations thereof, to produce a composite transparency having an inside ply and an outside ply.

7. A transparent composite according to claim 6, wherein said alcohol is benzyl alcohol.

8. A transparent composite according to claim 7 wherein said phosphite is triphenyl phosphite.

9. A transparent composite according to claim 8, wherein said trimethoxyboroxine comprises about 10 parts, wherein benzyl alcohol comprises about 3 parts, and wherein said triphenyl phosphite comprises about 10 parts.

10. A transparent composite according to claims 2 or 6, wherein acrylic comprises said outside ply of said composite transparency.

11. A transparent composite according to claim 10, wherein said inside ply is composed of a silicone interlayer, a silicate layer, a polyvinyl butyral interlayer, and a silicate layer, a silicone interlayer and a polycarbonate layer in contiguous relationship, respectively.

* * * * *